(12) United States Patent
Luo et al.

(10) Patent No.: US 12,244,338 B2
(45) Date of Patent: Mar. 4, 2025

(54) SAME-CABLE PROBABILITY DETECTION METHOD AND APPARATUS

(71) Applicant: Huawei Technologies Co., Ltd., Shenzhen (CN)

(72) Inventors: Xianlong Luo, Wuhan (CN); Chunhui Chen, Dongguan (CN); Minghui Fan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 17/950,703

(22) Filed: Sep. 22, 2022

(65) Prior Publication Data

US 2023/0013049 A1 Jan. 19, 2023

Related U.S. Application Data

(63) Continuation of application No. PCT/CN2021/078573, filed on Mar. 2, 2021.

(30) Foreign Application Priority Data

Mar. 23, 2020 (CN) .......................... 202010207862.7

(51) Int. Cl.
H04B 10/07 (2013.01)
G06F 17/18 (2006.01)
H04B 10/071 (2013.01)

(52) U.S. Cl.
CPC ........... H04B 10/071 (2013.01); G06F 17/18 (2013.01)

(58) Field of Classification Search
CPC ...... H04B 10/071; H04B 10/07; H04B 10/27; H04B 10/0773; H04B 10/079; G06F 17/18; G01M 11/3136
See application file for complete search history.

(56) References Cited

U.S. PATENT DOCUMENTS 5,381,257 A * 1/1995 Ferrar .................... H04B 10/07
398/40
7,885,539 B2 * 2/2011 Leppla ................ H04J 14/0305
398/13
(Continued)

FOREIGN PATENT DOCUMENTS

CN 101242224 A 8/2008
CN 102208942 A 10/2011
(Continued)

OTHER PUBLICATIONS

Salemian, S. et al., "Analysis of Polarization Mode Dispersion Effect on Quantum State Decoherence in Fiber-Based Optical Quantum Communication," Fiber Optics Communication, 11th International Conference on Telecommunications—ConTEL, Graz, Austria, Jun. 15-17, 2011, 6 pages.
(Continued)

Primary Examiner — Abdullahi Nur
(74) Attorney, Agent, or Firm — Slater Matsil, LLP

(57) ABSTRACT

This application discloses a same-cable probability detection method. The method includes: obtaining a first characteristic parameter of a first optical signal and a second characteristic parameter of a second optical signal, where the first optical signal is a signal transmitted in a first optical fiber, the second optical signal is a signal transmitted in a second optical fiber, the first characteristic parameter is generated after the first optical signal is affected by a vibration of the first optical fiber, and the second characteristic parameter is generated after the second optical signal is affected by a vibration of the second optical fiber; and obtaining, based on the first characteristic parameter and the second characteristic parameter, a probability that at least one optical cable segment of the first optical fiber and at least
(Continued)

one optical cable segment of the second optical fiber include a same-cable segment.

20 Claims, 12 Drawing Sheets

(56) References Cited

U.S. PATENT DOCUMENTS

| | | | |
|---|---|---|---|
| 10,584,982 | B2 | 3/2020 | Handerek et al. |
| 10,833,766 | B2* | 11/2020 | Ait Sab ................ H04B 10/29 |
| 11,973,532 | B2* | 4/2024 | Chen .................... H04B 10/073 |
| 2007/0274712 | A1 | 11/2007 | Leppla et al. |
| 2012/0014690 | A1* | 1/2012 | Gruber ............ H04B 10/07951 |
| | | | 398/25 |
| 2013/0293901 | A1 | 11/2013 | Li |
| 2020/0200592 | A1* | 6/2020 | Huang ................ H04B 10/071 |

FOREIGN PATENT DOCUMENTS

| | | |
|---|---|---|
| CN | 107948990 A | 4/2018 |
| CN | 108173594 A | 6/2018 |
| CN | 108833001 A | 11/2018 |
| CN | 110011728 A | 7/2019 |
| CN | 110601751 A | 12/2019 |

OTHER PUBLICATIONS

Yunbo, Y. et al., "Discussion on Application of Artificial Intelligence in Optical Network," Communications World, Dec. 2021, 5 pages (English Abstract).

* cited by examiner

SAME-CABLE PROBABILITY DETECTION METHOD AND APPARATUS

CROSS-REFERENCE TO RELATED APPLICATIONS

This application is a continuation of International Application No. PCT/CN2021/078573, filed on Mar. 2, 2021, which claims priority to Chinese Patent Application No. 202010207862.7, filed on Mar. 23, 2020. The disclosures of the aforementioned applications are hereby incorporated by reference in their entireties.

TECHNICAL FIELD

This application relates to the communication field, and in particular, to a same-cable probability detection method and an apparatus.

BACKGROUND

As an important communication medium, optical fibers are widely used in communication systems with a high speed, a large capacity, a low delay, and the like. Optical fibers are delicate and prone to fractures, and cannot be directly used for connection between devices. In an optical cable, a specific quantity of optical fibers form a cable core in a specific manner. A basic structure of an optical cable includes several parts such as a cable core, a reinforced steel wire, a filler, and a protection tube. An optical cable provides strong protection for optical fibers, so that an engineering-feasible solution is provided for device connection through optical fibers. However, a volume, a weight, and the like of an optical cable increase with a distance. An optical cable connected between devices for long-distance transmission needs to be formed by combining a plurality of optical cable segments. In addition, one optical cable segment may include a plurality of optical fibers, and different optical fibers may be used for transmission to different devices. It can be understood that, different optical fibers lead to different directions, and the optical fibers in the optical cable need to be split.

An optical fiber that connects two sites to perform communication is referred to as a communication path. Two communication paths may share a same optical cable segment. For example, if a communication path 1 includes an optical cable segment 1 and an optical cable segment 2, and a communication path 2 includes the optical cable segment 2 and an optical cable segment 3, the optical cable segment 2 is an optical cable segment shared by the communication path 1 and the communication path 2, and the shared optical cable segment may be referred to as a same-cable segment below. In addition, once a fault occurs in the same-cable segment of the communication path 1 and the communication path 2, for example, the same-cable segment is cut, bent, or squeezed, both the communication path 1 and the communication path 2 encounter a problem such as communication quality deterioration or even interruption.

In an existing solution, an optical cable segment of each optical fiber is usually manually recorded during optical cable layout, and whether two optical fibers share a same cable is determined by determining through comparison whether the two optical fibers pass through a same optical cable segment. However, manually recording same-cable information may consume a long time, resulting in a problem such as low efficiency, high maintenance costs, or high maintenance difficulty. Therefore, how to efficiently and accurately determine a shared optical cable segment between paths becomes an urgent problem to be resolved.

SUMMARY

This application discloses a same-cable probability detection method and an apparatus, to accurately and efficiently detect a probability that an optical cable segment is shared between optical fibers, so that the optical cable segment shared between the optical fibers can be accurately determined in time.

According to a first aspect, this application provides a same-cable probability detection method, including: obtaining a first characteristic parameter of a first optical signal and a second characteristic parameter of a second optical signal, where the first optical signal is a signal transmitted in a first optical fiber, the second optical signal is a signal transmitted in a second optical fiber, the first characteristic parameter is generated after the first optical signal is affected by a vibration of the first optical fiber, and the second characteristic parameter is generated after the second optical signal is affected by a vibration of the second optical fiber; and obtaining, based on the first characteristic parameter and the second characteristic parameter, a probability that at least one optical cable segment of the first optical fiber and at least one optical cable segment of the second optical fiber include a same-cable segment, where the same-cable segment is an optical cable segment shared by the first optical fiber and the second optical fiber.

Therefore, in this application, the probability that an optical cable segment is shared between the two optical fibers can be obtained based on the characteristic parameters of the optical signals that are in the two optical fibers and that are affected by the vibrations of the optical fibers. Therefore, costs of manual recording and maintenance can be reduced, and the probability that an optical cable segment is shared between the optical fibers can be quickly and accurately output. Further, whether a cable segment is shared between the transmission media can be determined based on the probability.

In a possible implementation, the first characteristic parameter includes a first state of polarization (SOP) characteristic parameter of the first optical signal, and the second characteristic parameter includes a second SOP characteristic parameter of the second optical signal.

In this implementation of this application, SOPs of the optical signals are changed due to impact of the vibrations of the optical fibers. Therefore, the SOP characteristic parameters of the optical signals affected by the vibrations of the optical fibers may be extracted, and SOP characteristics of the optical signals transmitted in the two optical fibers may be compared, so as to obtain the same-cable probability of the two optical fibers based on a comparison result. Costs of manual recording and maintenance can be reduced, and the probability that an optical cable segment is shared between the optical fibers can be quickly and accurately output.

In a possible implementation, the first SOP characteristic parameter includes a plurality of first SOP components, and the second SOP characteristic parameter includes a plurality of second SOP components; and the obtaining, based on the first characteristic parameter and the second characteristic parameter, a probability that at least one optical cable segment of the first optical fiber and at least one optical cable segment of the second optical fiber include a same-cable segment may include: comparing any first SOP component in the first SOP characteristic parameter with any second SOP component in the second SOP characteristic parameter, to obtain the probability that the at least one optical cable segment of the first optical fiber and the at least one optical cable segment of the second optical fiber include a same-cable segment, where the first SOP component and the second SOP component that are compared are components in a same dimension.

In this implementation of this application, the SOP characteristic parameter of the optical signal may include the plurality of SOP components. The SOP components in the same dimension of the SOP characteristic parameters of the optical signals transmitted in the two optical fibers may be compared, to obtain the same-cable probability of the two optical fibers, so that efficiency of obtaining the same-cable probability is improved.

In a possible implementation, the first SOP characteristic parameter includes a first SOP frequency, and the second SOP characteristic parameter includes a second SOP frequency; and the obtaining, based on the first characteristic parameter and the second characteristic parameter, a probability that at least one optical cable segment of the first optical fiber and at least one optical cable segment of the second optical fiber include a same-cable segment may include: comparing the first SOP frequency with the second SOP frequency, to obtain the probability that the at least one optical cable segment of the first optical fiber and the at least one optical cable segment of the second optical fiber include a same-cable segment. In this implementation of this application, the SOP frequencies of the optical signals transmitted in the two optical fibers may be compared, to obtain the same-cable probability of the two optical fibers, so that the probability that an optical cable segment is shared between the optical fibers is quickly and accurately output.

In a possible implementation, the first SOP characteristic parameter includes a first SOP amplitude, and the second SOP characteristic parameter includes a second SOP amplitude; and the obtaining, based on the first characteristic parameter and the second characteristic parameter, a probability that at least one optical cable segment of the first optical fiber and at least one optical cable segment of the second optical fiber include a same-cable segment may include: comparing the first SOP amplitude with the second SOP amplitude, to obtain the probability that the at least one optical cable segment of the first optical fiber and the at least one optical cable segment of the second optical fiber include a same-cable segment. In this implementation of this application, the SOP amplitudes of the optical signals may be compared, to quickly and accurately calculate the same-cable probability of the two optical fibers.

In a possible implementation, the first characteristic parameter includes a phase of the first optical signal, and the second characteristic parameter includes a phase of the second optical signal. In this implementation of this application, the extracted characteristic parameter of the optical signal may include the phase of the optical signal. Therefore, the phases of the optical signals transmitted in the two optical fibers may be compared, to accurately and quickly calculate the same-cable probability of the two optical fibers.

In a possible implementation, the first characteristic parameter is generated after the first optical signal is affected by a vibration of the first optical fiber in a first time period, the second characteristic parameter is generated after the second optical signal is affected by a vibration of the second optical fiber in a second time period, and the first time period and the second time period fall within a same time period range. In this implementation of this application, before the same-cable probability of the two optical fibers is calculated, the time periods in which the optical signals transmitted in the two optical fibers are affected by the vibrations may be further compared, and the same-cable probability of the two optical fibers is calculated only when the time periods in which the optical signals transmitted in the two optical fibers are affected by the vibrations are the same or close. This avoids meaningless calculation, and improves efficiency of calculating the same-cable probability.

In a possible implementation, the vibration of the first optical fiber and the vibration of the second optical fiber are vibrations with a preset characteristic, the first characteristic parameter is a characteristic parameter matching the preset characteristic, and the second characteristic parameter is a characteristic parameter matching the preset characteristic. In this implementation of this application, the vibrations of the two optical fibers are vibrations with the preset characteristic, such as vibrations with a fixed frequency or a fixed amplitude. Therefore, during extraction of a characteristic parameter of an optical signal, the characteristic parameter may be extracted based on the preset characteristic, so that a characteristic parameter matching the preset characteristic is extracted. For example, a characteristic parameter matching the preset characteristic may be extracted from an SOP parameter of an optical signal, to obtain an SOP characteristic parameter of the optical signal. For example, a phase matching the preset characteristic may be extracted from a phase of an optical signal, to obtain a characteristic parameter of the optical signal. Therefore, the characteristic parameters generated after the optical signals transmitted in the two optical fibers are affected by the vibrations of the optical fibers may be compared, to obtain the same-cable probability of the two optical fibers, so that the same-cable probability of the two optical fibers is accurately and quickly calculated.

According to a second aspect, this application provides a network device, including: an obtaining unit, configured to obtain a first characteristic parameter of a first optical signal and a second characteristic parameter of a second optical signal, where the first optical signal is a signal transmitted in a first optical fiber, the second optical signal is a signal transmitted in a second optical fiber, the first characteristic parameter is generated after the first optical signal is affected by a vibration of the first optical fiber, and the second characteristic parameter is generated after the second optical signal is affected by a vibration of the second optical fiber; and a processing unit, configured to obtain, based on the first characteristic parameter and the second characteristic parameter, a probability that at least one optical cable segment of the first optical fiber and at least one optical cable segment of the second optical fiber include a same-cable segment, where the same-cable segment is an optical cable segment shared by the first optical fiber and the second optical fiber.

For beneficial effects generated by any one of the second aspect and possible implementations of the second aspect, refer to the description of any one of the first aspect and the possible implementations of the first aspect.

In a possible implementation, the first characteristic parameter includes a first state of polarization SOP characteristic parameter of the first optical signal, and the second characteristic parameter includes a second SOP characteristic parameter of the second optical signal.

In a possible implementation, the first SOP characteristic parameter includes a plurality of first SOP components, and the second SOP characteristic parameter includes a plurality of second SOP components; and the processing unit is specifically configured to: compare any first SOP component in the first SOP characteristic parameter with any second SOP component in the second SOP characteristic parameter, to obtain the probability that the at least one optical cable segment of the first optical fiber and the at least one optical cable segment of the second optical fiber include a same-cable segment, where the first SOP component and the second SOP component that are compared are components in a same dimension.

In a possible implementation, the first SOP characteristic parameter includes a first SOP frequency, and the second SOP characteristic parameter includes a second SOP frequency; and the processing unit is specifically configured to: compare the first SOP frequency with the second SOP frequency, to obtain the probability that the at least one optical cable segment of the first optical fiber and the at least one optical cable segment of the second optical fiber include a same-cable segment.

In a possible implementation, the first SOP characteristic parameter includes a first SOP amplitude, and the second SOP characteristic parameter includes a second SOP amplitude; and the processing unit is specifically configured to: compare the first SOP amplitude with the second SOP amplitude, to obtain the probability that the at least one optical cable segment of the first optical fiber and the at least one optical cable segment of the second optical fiber include a same-cable segment.

In a possible implementation, the first characteristic parameter includes a phase of the first optical signal, and the second characteristic parameter includes a phase of the second optical signal.

In a possible implementation, the first characteristic parameter is generated after the first optical signal is affected by a vibration of the first optical fiber in a first time period, the second characteristic parameter is generated after the second optical signal is affected by a vibration of the second optical fiber in a second time period, and the first time period and the second time period fall within a same time period range.

In a possible implementation, the vibration of the first optical fiber and the vibration of the second optical fiber are vibrations with a preset characteristic, the first characteristic parameter is a characteristic parameter matching the preset characteristic, and the second characteristic parameter is a characteristic parameter matching the preset characteristic.

According to a third aspect, this application provides a network device, including a processor and a memory. The processor and the memory are interconnected by using a line. The processor invokes program code in the memory to perform a processing-related function in the same-cable probability detection method described in any implementation of the first aspect.

According to a fourth aspect, this application provides a communication system, including a network device and at least one node. The at least one node transmits data by using a connected transmission medium. The network device is as described in the second aspect.

According to a fifth aspect, an embodiment of this application provides a digital processing chip. The chip includes a processor and a memory. The memory and the processor are interconnected by using a line. The memory stores instructions. The processor is configured to perform a processing-related function in the method according to any implementation of the first aspect.

According to a sixth aspect, an embodiment of this application provides a computer-readable storage medium, including instructions. When the instructions are run on a computer, the computer is enabled to perform the method according to any implementation of the first aspect.

According to a seventh aspect, an embodiment of this application provides a computer program product including instructions. When the computer program product runs on a computer, the computer is enabled to perform the method according to any implementation of the first aspect.

DETAILED DESCRIPTION OF ILLUSTRATIVE EMBODIMENTS

The following describes the technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

First, a same-cable probability detection method provided in this application may be applied to an optical communication network, and is used to detect whether an optical cable segment is shared by optical fibers. The optical communication network includes, but is not limited to, an optical transport network (OTN), an optical access network (OAN), a synchronous digital hierarchy (SDH), a passive optical network (PON), an Ethernet, or any one or a combination of a plurality of a flexible Ethernet (FlexE), a wavelength division multiplexing (WDM) network, and the like.

Figure 1:
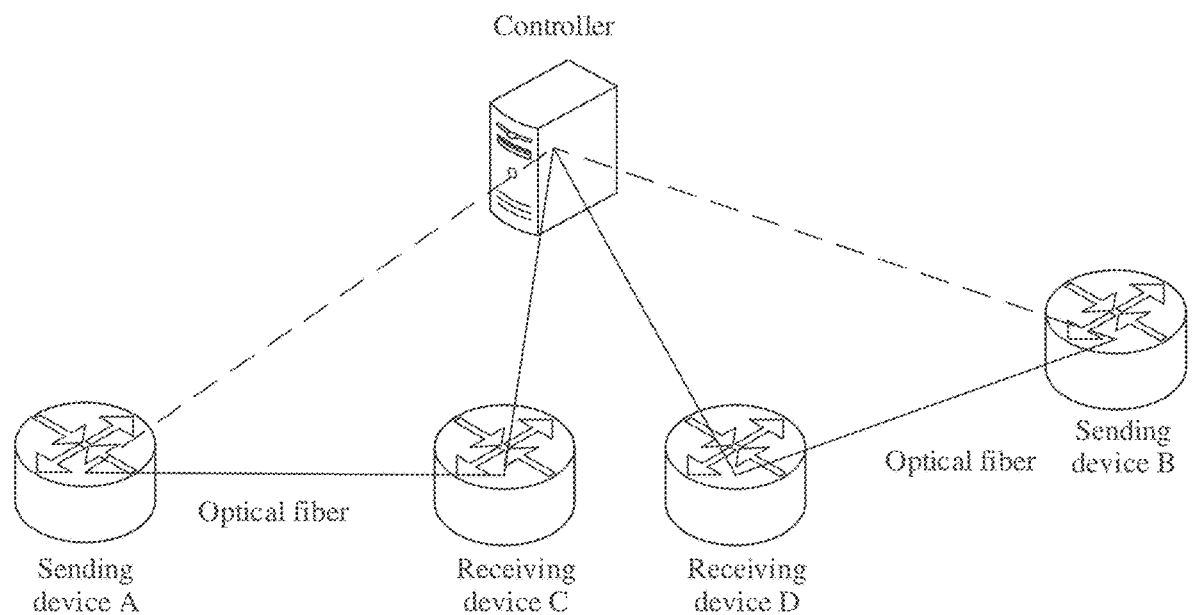
FIG. 1 is a schematic diagram of a structure of a communication system according to this application.

With reference to an optical communication network shown in FIG. 1, the following provides an example description of the communication system to which the same-cable probability detection method provided in this application is applied. The optical communication network may include a plurality of network elements and a controller. The plurality of network elements are a sending device A, a sending device B, a receiving device C, a receiving device D, and the like shown in FIG. 1. Certainly, the four network elements herein are merely examples for description. In an actual application scenario, more or fewer devices may be included. This is not limited in this application.

The sending device A is connected to the receiving device C by using an optical fiber. The sending device B is connected to the receiving device D by using an optical fiber. The optical fiber is configured to transmit data between the devices.

The controller is connected to the receiving devices in the optical communication network, to obtain specific information about optical signals received by the receiving devices, for example, information such as states of polarization (SOP), frequencies, or phases of the optical signals. For example, after receiving optical signals sent by the sending device A and the sending device B, the receiving device C and the receiving device D perform detection on the received optical signals to obtain information such as SOPs, frequencies, or phases of the optical signals, and send the information such as the SOPs, the frequencies, or the phases of the optical signals to the controller. The controller is configured to determine, based on the specific information about the optical signals collected by the receiving devices, a probability that an optical cable segment is shared between the two optical fibers.

Certainly, the controller may alternatively be connected to the sending devices in the optical communication network. In the following implementations of this application, a connection between the controller and the receiving device is used as an example for description. A connection between the controller and the sending device is not limited. In addition, the network element in the optical communication network may have both an optical signal sending function and an optical signal receiving function. Therefore, in the embodiments of this application, the sending device is a network element that sends an optical signal, and the receiving device is a network element that receives an optical signal. In an actual application scenario, the sending device may also have an optical signal receiving function, and the receiving device may also have an optical signal sending function.

The same-cable probability detection method provided in this application may be executed by the controller, for example, a software defined network (SDN) controller or a path computation element (PCE), or may be executed by a network element in the optical communication network. Specifically, adjustment may be performed based on an actual application scenario.

For ease of understanding, the following describes terms in this application.

Optical fiber: a fiber made of glass or plastic. It serves as an optical conduction tool and is configured to transmit transmission data between devices.

Figure 2:
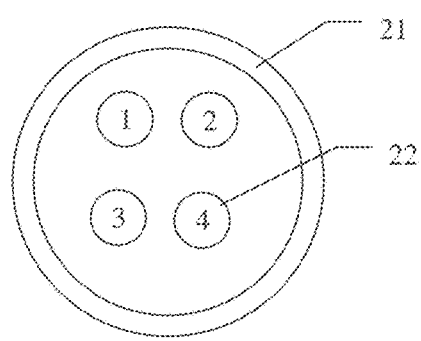
FIG. 2 is a schematic diagram of a cross-section of an optical cable according to an embodiment of this application.

Optical cable: a communication cable that transmits optical signals through its internal fiber core, to implement large-capacity information communication. Usually, a volume and a weight of an optical cable increase with a distance. Therefore, if one optical cable segment cannot implement data transmission between devices at a relatively long distance, a plurality of optical cable segments need to be spliced together. In addition, one optical cable segment may include one or more optical fibers, and the one or more optical fibers are externally wrapped with a protection tube or the like. For example, FIG. 2 shows an example structure of a cross section of an optical cable. The optical cable includes a protection tube 21, and four optical fibers 22 are wrapped inside the protection tube 21, that is, an optical fiber 1, an optical fiber 2, an optical fiber 3, and an optical fiber 4 in FIG. 2. In addition, other components such as a filler and a power cable are further disposed inside the optical cable. In this application, a structural relationship between the optical cable and the optical fibers is described herein, and other components included in the optical cable are not limited.

Optical distribution frame (ODF): used for termination and distribution of a backbone optical cable at a central office end. The ODF can conveniently implement connection, distribution, dispatching, and the like of optical fibers.

Optical cross connection cabinet: a passive device, which divides an optical cable with a large quantity of optical fiber pairs into optical cables with a small quantity of optical fiber pairs for different transmission directions.

Splitting and splicing closure: also called a fiber splicing box. It is used to connect a plurality of optical cable segments.

Figure 3:
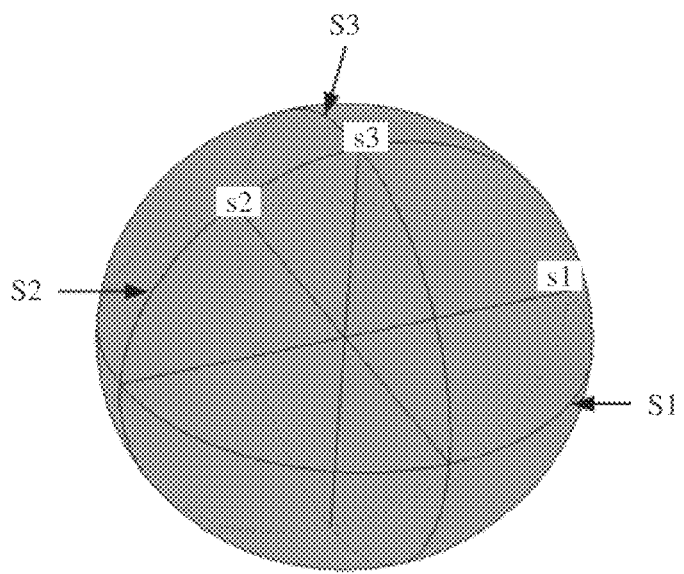
FIG. 3 is a schematic diagram of an SOP representation manner according to an embodiment of this application.

State of polarization (SOP): used to represent an attribute of light. In a direction perpendicular to a transmission direction, an optical signal may have two mutually independent vibration directions. A vibration in one direction may be referred to as a polarization of the optical signal. Sizes of electric field intensities and phase differences may change independently in the two polarization directions. An SOP is determined by an amplitude ratio of two polarizations and a phase difference between the two polarizations. If two polarizations are different in a loss, an optical fiber delay, dispersion, nonlinearity, or the like, an amplitude difference and/or a phase difference between two polarizations of one optical signal at a moment may be changed, so that an SOP of the optical signal is changed. Generally, an SOP of an optical signal may be represented by using a Poincare ball, and a point on a spherical surface corresponds to a different SOP. For example, as shown in FIG. 3, three tangent cross sections of the Poincare ball respectively represent three components of the SOP: S1, S2, and S3.

Based on the foregoing description, it can be learned that a volume and a weight of an optical cable increase with a distance between devices. Therefore, if one optical cable segment cannot implement data transmission between devices at a relatively long distance, a plurality of optical cable segments need to be spliced together. In addition, because a length of one optical cable segment is limited, a plurality of optical cable segments may be connected by using an ODF, an optical cross connection cabinet, a connection box, or the like. This can also be understood as that the optical cross connection cabinet, the connection box, or the like divides an optical cable into the plurality of optical cable segments.

Figure 4:
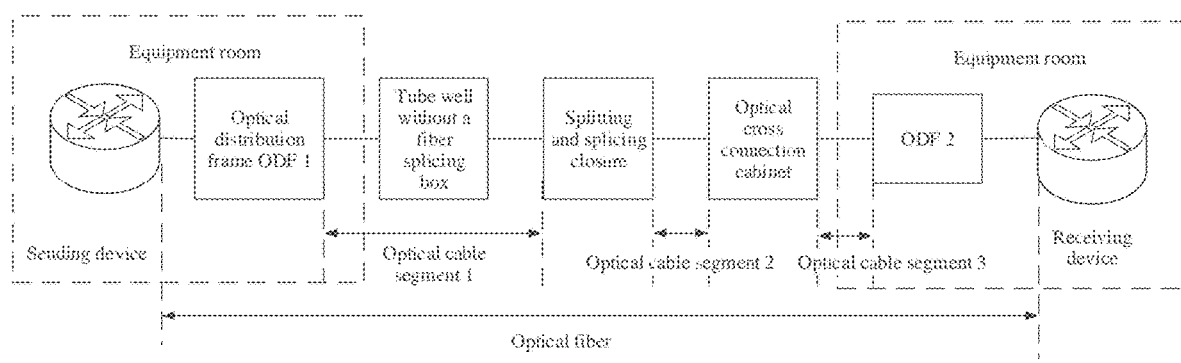
FIG. 4 is a schematic diagram of an optical fiber according to an embodiment of this application.

For example, as shown in FIG. 4, an ODF 1, a splitting and splicing closure, an optical cross connection cabinet, and an ODF 2 divide an optical fiber between a sending device and a receiving device into a plurality of segments. Each optical fiber segment is located or wrapped in a different optical cable segment. For example, an optical fiber between the ODF 1 and the splitting and splicing closure is located or wrapped in an optical cable segment 1; an optical fiber between the splitting and splicing closure and the optical cross connection cabinet is located or wrapped in an optical cable segment 2; and an optical fiber between the optical cross connection cabinet and the ODF 2 is located or wrapped in an optical cable segment 3. An optical cable segment may be understood as a continuous optical cable segment between two connection points, and there is no splice point or connection point in this continuous optical cable segment.

Optionally, in this application, a vibrator may be disposed on an optical cable segment on which same-cable detection needs to be performed, so as to generate a vibration to drive an optical fiber to vibrate. For example, with reference to FIG. 4, a vibrator may be disposed at a tube well without a fiber splicing box, a splitting and splicing closure, an optical cross connection cabinet, an equipment room, or any position of an optical cable segment, so as to make the optical cable vibrate. In this way, which optical fibers pass through a same optical cable segment can be detected through a cable vibration.

Figure 5A:
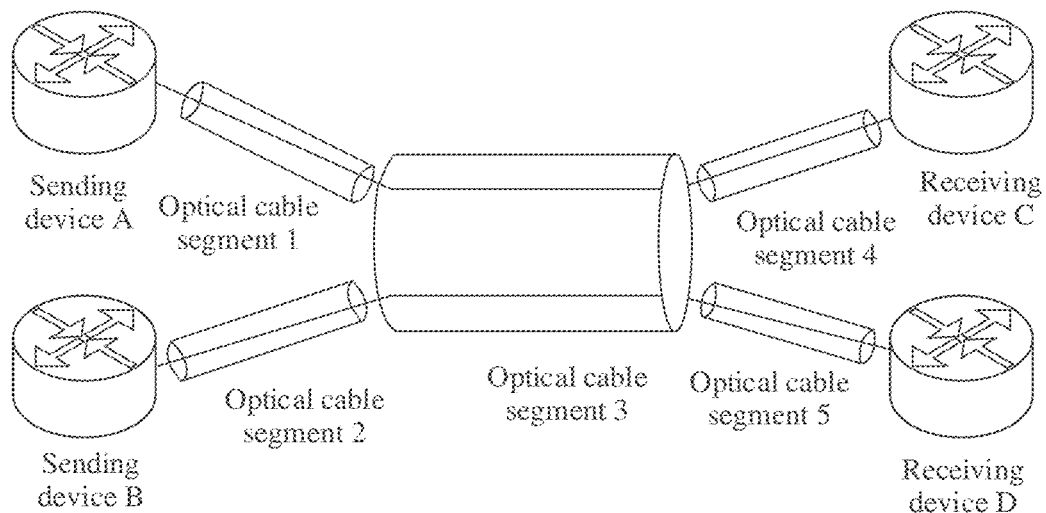
FIG. 5A is a schematic diagram of an optical cable segment shared by two optical fibers according to an embodiment of this application.
Figure 5B:
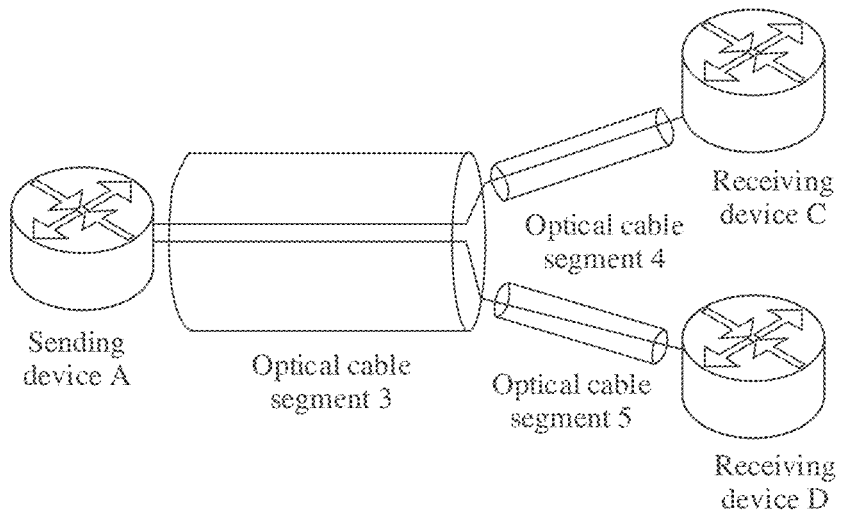
FIG. 5B is another schematic diagram of an optical cable segment shared by two optical fibers according to an embodiment of this application.

For ease of understanding, the following provides an example description on some specific scenarios to which the same-cable probability detection method provided in this application is applied. For example, as shown in FIG. 5A, the application scenario may include at least two optical communication devices, for example, may include a sending device A, a sending device B, a receiving device C, and a receiving device D. An optical fiber is separately used to connect the device A to the device C and connect the device B to the device D. The optical fiber connected between the sending device A and the receiving device C may be located or wrapped in an optical cable segment 1, an optical cable segment 3, and an optical cable segment 4. The optical fiber connected between the sending device B and the receiving device D may be located or wrapped in an optical cable segment 2, the optical cable segment 3, and an optical cable segment 5. Therefore, the optical cable segment 3 is an optical cable segment shared by the optical fiber connected between the sending device A and the receiving device C and the optical fiber connected between the sending device B and the receiving device D. For another example, as shown in FIG. 5B, the application scenario may include a sending device A, a receiving device C, a receiving device D, and the like. An optical fiber connected between the sending device A and the receiving device C may be located or wrapped in an optical cable segment 3 and an optical cable segment 4. An optical fiber connected between the sending device A and the receiving device D may be located or wrapped in the optical cable segment 3 and an optical cable segment 5. Therefore, the optical cable segment 3 is an optical cable segment shared by the optical fiber connected between the sending device A and the receiving device C and the optical fiber connected between the sending device A and the receiving device D.

Although an optical cable protects an optical fiber, once the optical cable is faulty (for example, cut, bent, or squeezed), all optical paths passing through the optical cable become faulty, causing communication quality deterioration or even interruption or the like. Therefore, to improve communication reliability, active/standby protection is usually used, that is, a plurality of optical fibers are connected between two devices. When an active path is faulty, service data may be switched to a standby path for transmission.

Figure 6:
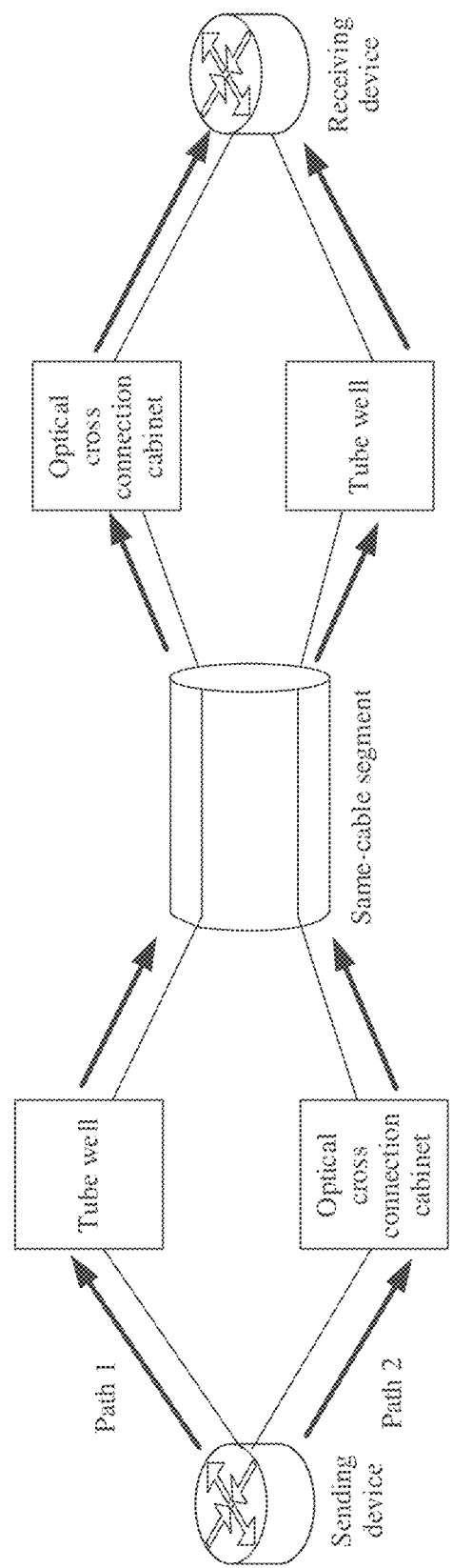
FIG. 6 is another schematic diagram of an optical cable segment shared by two optical fibers according to an embodiment of this application.

However, when the active path and the standby path share a same cable, if a shared optical cable segment is faulty, for example, is cut, bent, or squeezed, data cannot be transmitted between the two devices, the active/standby protection fails, and the active path and the standby path cannot provide protection. For example, as shown in FIG. 6, a path 1 and a path 2 formed by optical fibers exist between a sending device and a receiving device. The path 1 and the path 2 share a same-cable segment. If the same-cable segment is faulty, for example, is cut, bent, or squeezed, transmission on both the path 1 and the path 2 is interrupted, and data transmission between the sending device and the receiving device is affected or even cannot be performed. Therefore, to avoid a risk that the active path and the standby path share a same cable, it is necessary to quickly and accurately implement same-cable segment identification in a manner of being adaptive to dynamic network changes. However, if information about devices that optical cables pass through is manually recorded, relatively high labor costs are required. When some devices or optical cables in the optical cables are changed or updated, manual maintenance is required, and the updated devices or optical cables may not be manually recorded in time. As a result, an optical cable segment shared between two optical fibers cannot be recorded in time, affecting data transmission between devices.

Therefore, this application provides the same-cable probability detection method, so as to accurately and efficiently detect a probability that an optical cable segment is shared between different optical fibers.

Figure 7:
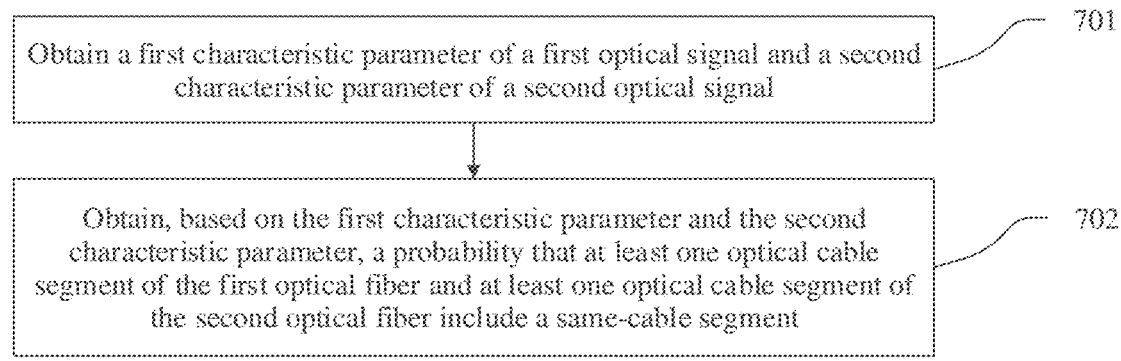
FIG. 7 is a schematic flowchart of a same-cable probability detection method according to this application.

With reference to FIG. 7, the following describes a procedure of the same-cable probability detection method provided in this application. The method may be performed by a controller or a network element.

701: Obtain a first characteristic parameter of a first optical signal and a second characteristic parameter of a second optical signal.

The first optical signal is transmitted in a first optical fiber, the second optical signal is transmitted in a second optical fiber, the first characteristic parameter is generated after the first optical signal is affected by a vibration of the first optical fiber, and the second characteristic parameter is generated after the second optical signal is affected by a vibration of the second optical fiber.

For example, referring to FIG. 6, the first optical signal may be sent by the sending device to the receiving device by using the path 1, and the second optical signal may be sent by the sending device to the receiving device by using the path 2. When the optical fiber of the path 1 vibrates, the first optical signal is affected by the vibration of the optical fiber of the path 1. When the optical fiber of the path 2 vibrates, the second optical signal is affected by the vibration of the optical fiber of the path 2. The first characteristic parameter is a parameter of a change that is caused to the first optical signal by the vibration of the optical fiber of the path 1. The second characteristic parameter is a parameter of a change that is caused to the second optical signal by the vibration of the optical fiber of the path 2.

In a possible implementation, the first characteristic parameter may include a first SOP characteristic parameter of the first optical signal, and the second characteristic parameter may include a second SOP characteristic parameter of the second optical signal. The first SOP characteristic parameter may include one or more parameters related to an SOP of the first optical signal. The second SOP characteristic parameter includes one or more parameters related to an SOP of the second optical signal. The first SOP characteristic parameter and the second SOP characteristic parameter may be detected by an SOP detection device disposed in the receiving device. The SOP detection device may be, for example, a polarimeter or a polarization scrambler that detects an SOP.

In this embodiment of this application, the SOP of the first optical signal is referred to as a first SOP, and the SOP of the second optical signal is referred to as a second SOP. Details are not described again below.

Figure 8A:
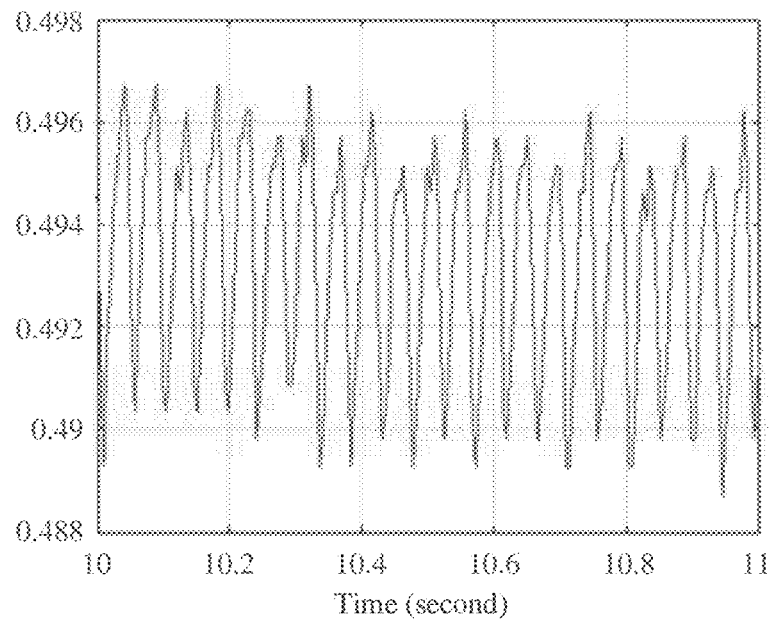
FIG. 8A is a schematic diagram of an SOP characteristic parameter according to an embodiment of this application.
Figure 8B:
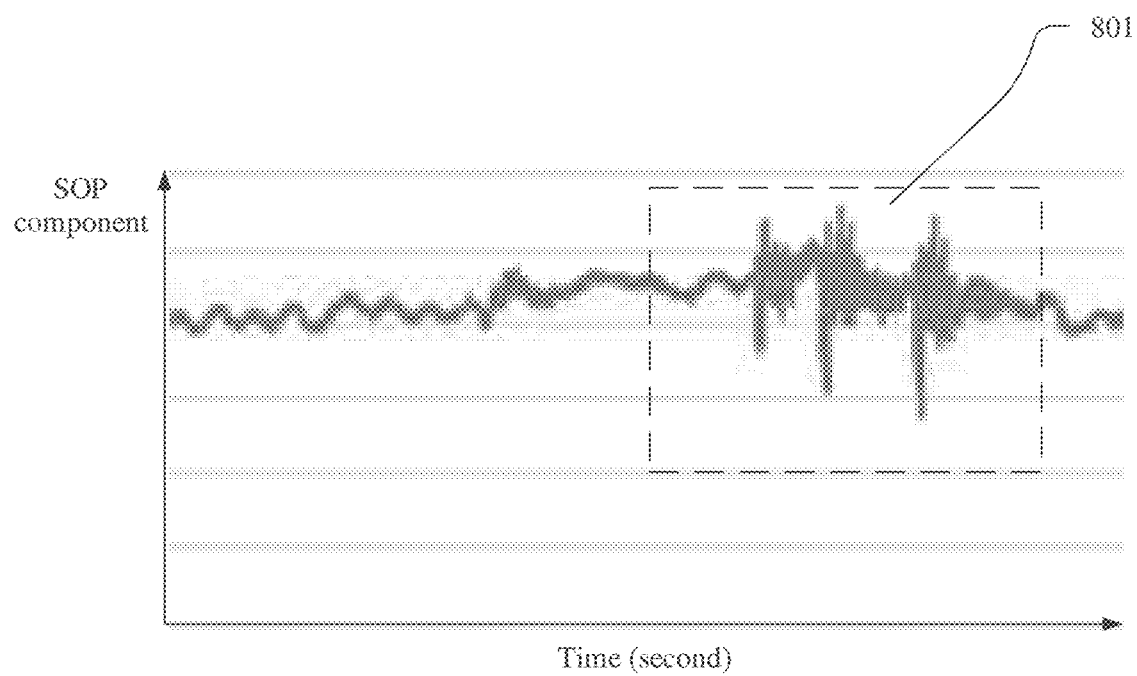
FIG. 8B is a schematic diagram of another SOP characteristic parameter according to an embodiment of this application.

Specifically, the first SOP characteristic parameter may include a plurality of first SOP components, and the second SOP characteristic parameter may include a plurality of second SOP components. For example, the first SOP characteristic parameter and the second SOP characteristic parameter each may be represented by using a three-dimensional characteristic. Each one-dimensional characteristic can be understood as one component of the SOP characteristic parameter. Three-dimensional components are respectively represented as S1, S2, and S3. For example, any SOP component of the first SOP characteristic parameter or the second SOP characteristic parameter may be represented as that shown in FIG. 8A. Peaks and valleys in FIG. 8A correspond to vibrations of an optical fiber that transmits a corresponding optical signal. For example, one peak may represent one vibration of the optical fiber, and amplitude fluctuations of the component shown in FIG. 8A are generated by regular vibrations of the optical fiber. It should be understood that, when the optical fiber has no vibration, a noise floor may exist in the component. For another example, FIG. 8B shows any component of an SOP of an optical signal. In this embodiment of this application, 801 in FIG. 8B shows a component that is changed due to irregular vibrations of the optical fiber.

Figure 9A:
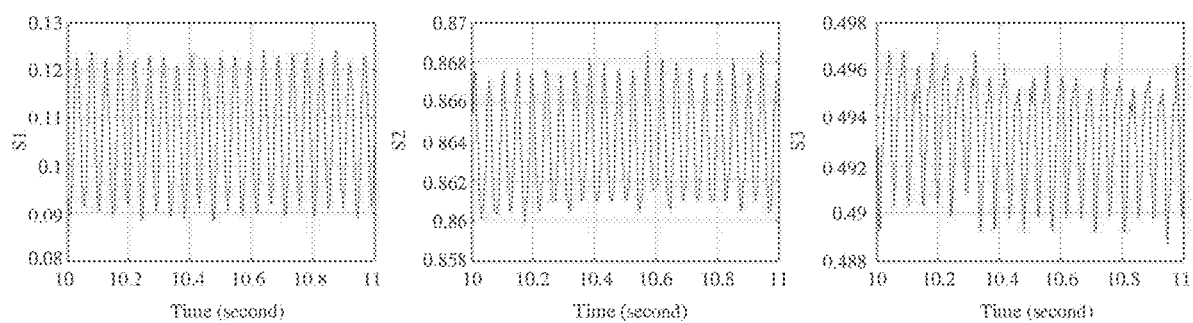
FIG. 9A is a schematic diagram of components of an SOP characteristic parameter according to an embodiment of this application.
Figure 9B:
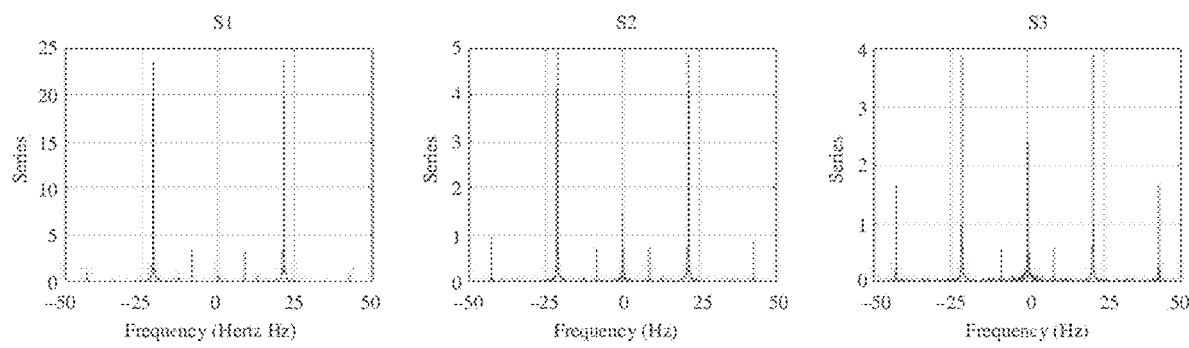
FIG. 9B is a schematic diagram of an SOP frequency according to an embodiment of this application.

In a possible implementation, the first SOP characteristic parameter may include a first SOP frequency, and the second SOP characteristic parameter may include a second SOP frequency. Specifically, an SOP frequency of an optical signal may be obtained by transforming an SOP component of the optical signal. For example, Fourier transform may be performed on any component of the first SOP characteristic parameter to obtain the first SOP frequency, or Fourier transform may be performed on any component of the second SOP characteristic parameter to obtain the second SOP frequency. For example, the components S1, S2, and S3 of the SOP characteristic parameter may be shown in FIG. 9A. Then, as shown in FIG. 9B, Fourier transform is performed on the components S1, S2, and S3 to obtain frequencies respectively corresponding to S1, S2, and S3 that are obtained after the transform. The frequencies shown in FIG. 9B are close to 25 Hz.

Figure 10:
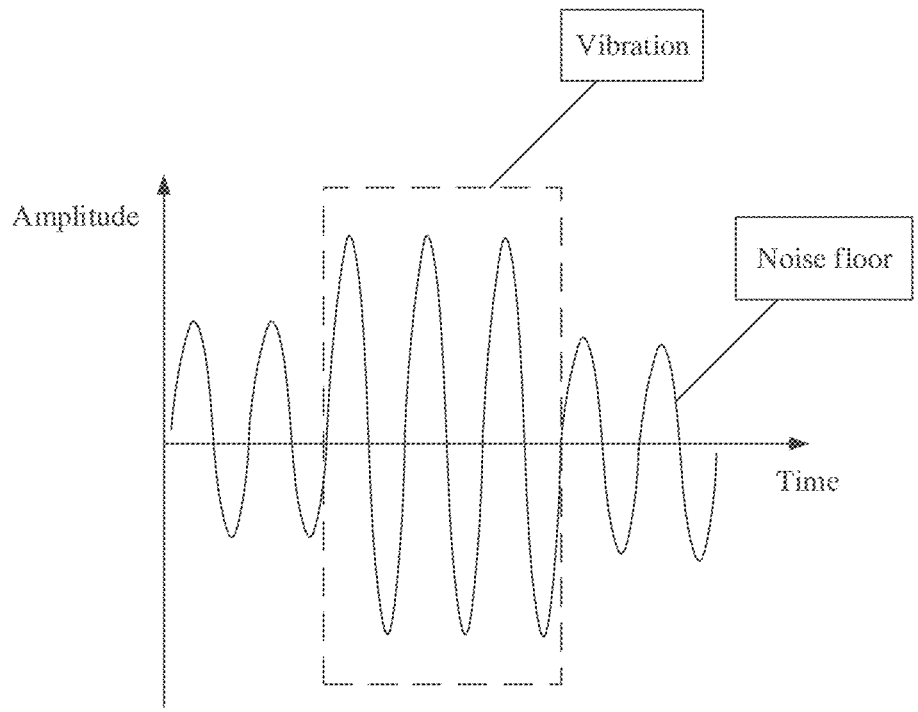
FIG. 10 is a schematic diagram of an SOP amplitude according to an embodiment of this application.

In a possible implementation, the first SOP characteristic parameter includes a first SOP amplitude, and the second SOP characteristic parameter includes a second SOP amplitude. For example, FIG. 10 includes a noise floor part and a part that is obtained after one or more SOP components of the first optical signal or one or more SOP components of the second optical signal are affected by a vibration of the optical fiber. An amplitude value of the part that is obtained after the one or more SOP components are affected by the vibration may be detected, to obtain one or more SOP amplitudes. Certainly, in this embodiment of this application, to detect one SOP component of an optical signal, SOP components corresponding to two optical signals may be detected. For example, components S1 of SOPs of the two optical signals are detected, or components S2 of the SOPs of the two optical signals are detected, or components S3 of the SOPs of the two optical signals are detected, so as to obtain SOP amplitudes of the two optical signals.

In a possible implementation, the first characteristic parameter may include a phase of the first optical signal, and the second characteristic parameter may include a phase of the second optical signal. Compared with a case in which the optical fiber does not vibrate, a phase lead or a phase lag may occur in the phase of the first optical signal or the phase of the second optical signal due to a vibration of the optical fiber. Therefore, by comparing the phases of the two optical signals, a same-cable probability of the two optical fibers that transmit the two optical signals can be calculated.

It can be learned with reference to the foregoing description that, the foregoing characteristic parameters (for example, the first characteristic parameter and the second characteristic parameter) each may include but is not limited to one or a combination of a plurality of the following: SOP characteristic parameters such as an SOP component, an SOP frequency, and an SOP amplitude, a phase of an optical signal, and the like.

In a possible implementation, the vibrations of the first optical fiber and the second optical fiber may be vibrations generated due to vibrations of a vibrator. For example, a vibrator may be disposed in an optical cable segment in which the first optical fiber or the second optical fiber is located. When the vibrator vibrates, the optical cable also vibrates with the vibrator, and further the optical fiber inside the optical cable also vibrates with the vibration of the optical cable. In a scenario, a vibration may be performed in each optical cable segment of an optical fiber, or a vibration may be performed at any position of each optical cable segment, or a vibration may be performed at a connecting point of an optical cable. For example, a vibration may be performed at a position of one optical fiber, such as a tube well with a fiber splicing box, a tube well without a fiber splicing box, an ODF, or an optical cross connection cabinet.

The vibrations of the first optical fiber and the second optical fiber may alternatively be vibrations generated after the first optical fiber and the second optical fiber are affected by an environmental change, for example, may be vibrations generated by a sound wave, an air flow, or the like. For example, if the optical cable in which the first optical fiber or the second optical fiber is located is exposed on a ground, it is possible that the optical cable vibrates due to a vibration generated by the ground, or vibrates due to a high-frequency sound wave, or vibrates due to impact of an air flow.

In a possible implementation, the vibrations of the first optical fiber and the second optical fiber may be vibrations generated due to vibrations of a vibrator. The vibrator may generate a vibration with a preset characteristic, so that the first optical fiber or the second optical fiber generates a vibration with the preset characteristic accordingly. In this way, a change corresponding to the preset characteristic is generated in the first optical signal transmitted in the first optical fiber, and a change corresponding to the preset characteristic is generated in the second optical signal transmitted in the second optical fiber. The preset characteristic of a vibration may be a vibration frequency, a vibration amplitude, or the like. It can be understood that, in this application, the first characteristic parameter may be a characteristic parameter matching the preset characteristic, and the second characteristic parameter is also a characteristic parameter matching the preset characteristic. Matching the preset characteristic can be understood as follows: a change pattern of the first characteristic parameter is the same or roughly the same as a vibration pattern, for example, a quantity of change times of the first characteristic parameter is the same or roughly the same as a quantity of vibration times.

For example, if vibrations of an optical fiber are regular vibrations in a specific time period, for example, 1000 vibrations per second, an optical signal transmitted in the optical fiber is affected by the vibrations, and an SOP or a phase of the optical signal is changed. If an SOP amplitude of the optical signal encounters 1000 abrupt changes per second, some SOPs with abrupt amplitude changes may be extracted from SOPs of the optical signal, to obtain a characteristic parameter that is of the optical signal and that matches the vibration characteristic. In this example, there may be approximately 1000 SOP amplitude changes of the optical signal per second, that is, a quantity of SOP amplitude changes is unnecessarily strictly the same as the quantity of vibrations.

For another example, if vibrations of an optical fiber are three vibrations in a specific time period, an optical signal transmitted in the optical fiber may encounter three abrupt frequency changes. If Fourier transform is performed on one or more SOP components of the optical signal, an SOP frequency of the optical signal can be read from a result obtained after the Fourier transform is performed on the one or more SOP components, and a characteristic parameter of the optical signal transmitted in the optical fiber can be obtained.

In addition, in another case, in this embodiment of this application, a device for sending an optical signal or a device for receiving an optical signal may be a device with high sensitivity. For example, a narrow-line-width laser may be used to send an optical signal. Alternatively, a detection device with high sensitivity may be used to detect an optical signal, so that when an optical signal is transmitted in an optical fiber, the optical signal can be detected even if the optical signal is affected by a slight vibration of the optical fiber. Therefore, a same-cable probability of two optical fibers can be calculated in time based on a characteristic parameter of the detected optical signal affected by the vibration, to implement real-time monitoring on a same-cable probability between optical fibers in an optical communication network.

It should be further noted that, the method provided in this application may be performed by a controller or by a network element in an optical communication network. If the method provided in this application is performed by a controller, after the receiving device receives the first optical signal and then sends the first optical signal or a parameter such as an optical power, a phase, or a frequency of the first optical signal to the controller, the controller may extract the first characteristic parameter based on the received data. A manner of obtaining the second characteristic parameter is similar, and details are not described again. If the method provided in this application is performed by a network element, the network element may directly receive the optical signals sent by the sending device, so as to detect information such as the SOP characteristic parameters or the phases of the received optical signals, to obtain the first characteristic parameter and the second characteristic parameter.

Figure 11A:
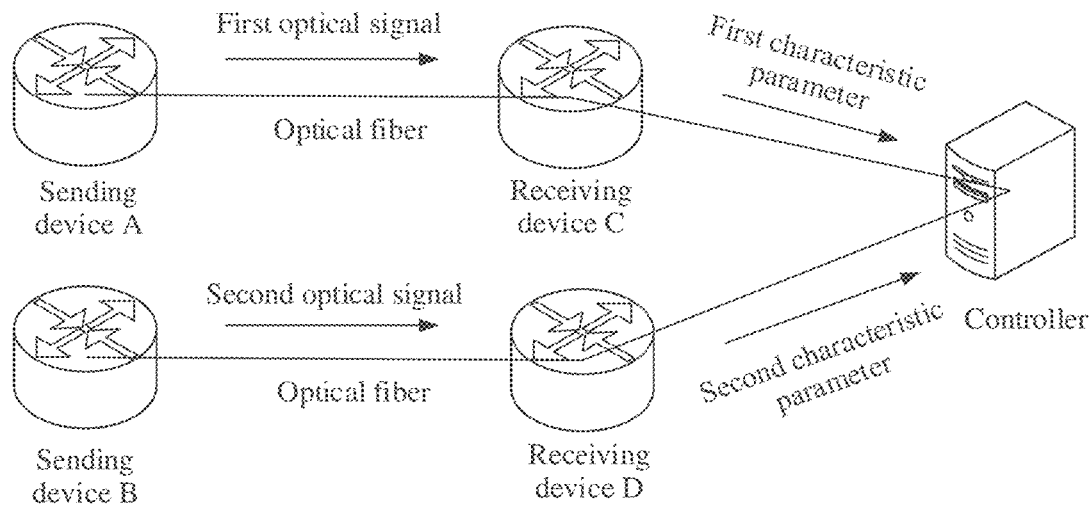
FIG. 11A is a schematic diagram of an optical signal receiving manner according to an embodiment of this application.

For example, as shown in FIG. 11A, a receiving device C and a receiving device D each may be provided with a board for receiving an optical signal, for example, a wavelength division multiplexing (wavelength division multiplexing, WDM) board. After receiving a first optical signal sent by a sending device A, the receiving device C detects a first characteristic parameter of the first optical signal, and sends the obtained first characteristic parameter to a controller; and after receiving a second optical signal sent by a sending device B, the receiving device D sends an obtained second characteristic parameter to the controller, so that the controller can obtain the first characteristic parameter and the second characteristic parameter.

Figure 11B:
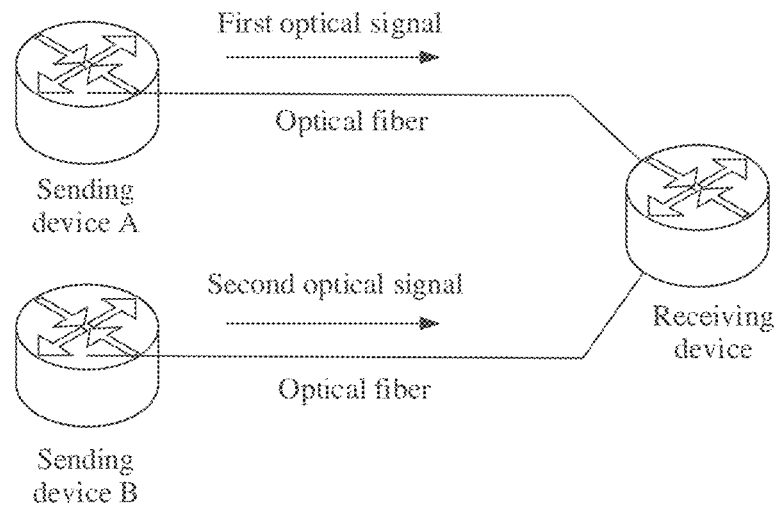
FIG. 11B is a schematic diagram of another optical signal receiving manner according to an embodiment of this application.

For example, as shown in FIG. 11B, the method provided in this application may be performed by a network element in an optical communication network, for example, may be performed by a receiving device. The receiving device may be internally integrated with a board for receiving an optical signal, for example, a WDM board. The receiving device may directly receive a first optical signal sent by a sending device A or a second optical signal sent by a sending device B. For example, the receiving device may be integrated with a fiber interface unit (fiber interface unit, FIU), so that the FIU can receive the optical signal sent by the sending device. Then, the receiving device detects information such as an SOP characteristic parameter, a phase, or an optical power of the first optical signal or the second optical signal, to obtain a characteristic parameter of the first optical signal or the second optical signal, and perform subsequent step 702.

702. Obtain, based on the first characteristic parameter and the second characteristic parameter, a probability that at least one optical cable segment of the first optical fiber and at least one optical cable segment of the second optical fiber include a same-cable segment.

After the first characteristic parameter and the second characteristic parameter are obtained, the first characteristic parameter and the second characteristic parameter are compared to obtain the probability that the at least one optical cable segment of the first optical fiber and the at least one optical cable segment of the second optical fiber include a same-cable segment.

It should be noted that, in this application, two optical fibers are used as an example for description. Actually, a same-cable probability of more optical fibers may be calculated, and a calculation manner is similar. Specifically, adjustment may be performed based on an actual application scenario. This is not limited in this application.

The first characteristic parameter or the second characteristic parameter may include but is not limited to one or a combination of a plurality of the following: SOP characteristic parameters such as an SOP component, an SOP frequency, and an SOP amplitude, a phase of an optical signal, and the like. Different comparison manners are separately described by using examples below. For ease of understanding, a probability that an optical cable segment is shared by two optical fibers is referred to as a same-cable probability below.

Manner 1: Based on an SOP Characteristic of an Optical Signal

A characteristic parameter of an optical signal may include an SOP characteristic parameter of the optical signal. SOP characteristic parameters in characteristic parameters of two optical signals may be compared to calculate a difference, for example, an amplitude difference or a frequency difference, between the SOP characteristic parameters of the two optical signals. Then, a same-cable probability of two optical fibers may be calculated based on the difference. Usually, a smaller difference between the SOP characteristic parameters indicates a higher same-cable probability of the two optical fibers.

For example, in this embodiment of this application, one difference is used as an example. A specific manner of calculating a probability value by using the difference may include: after the difference is calculated, an area is calculated based on a location of the difference in a normal distribution, to obtain the probability value. Moreover, in addition to the normal distribution manner, the same-cable probability may be calculated in another manner, for example, a linear relationship or cross entropy. The manner herein is merely an example for description. In the following, the same-cable probability may also be calculated by using the difference in this calculation manner, and details are not described herein.

More specifically, manners of comparing SOP characteristics may be specifically classified into manners of comparing one type of SOP components, frequencies, amplitudes, and the like of optical signals, which are separately described below.

In a specific implementation, an SOP characteristic parameter of an optical signal may include a plurality of SOP components. For example, the first SOP characteristic parameter of the first optical signal may include a plurality of first SOP components, and the second SOP characteristic parameter of the second optical signal may include a plurality of second SOP components. For the SOP components, refer to the related description in step 701 above. Any type of SOP components in SOP characteristic parameters of two optical signals may be compared to obtain an amplitude difference or a phase difference between the type of SOP components of the two optical signals. Then, a same-cable probability of two optical fibers may be calculated based on the difference. The compared SOP components of the two optical signals are components in a same dimension.

For example, an SOP characteristic parameter of an optical signal may include three components: S1, S2, and S3. Any type of components may be compared between two optical signals, for example, the components S1 of the two optical signals may be compared, or the components S2 of the two optical signals may be compared, or the components S3 of the two optical signals may be compared. A same-cable probability of two optical fibers that transmit the two optical signals may be calculated based on an amplitude difference or a phase difference between the type of components. For ease of understanding, it can also be understood that, an SOP characteristic parameter of an optical signal has a three-dimensional characteristic. Any type of one-dimensional characteristics of two optical signals may be compared, and a same-cable probability of two optical fibers may be calculated based on a difference between the type of one-dimensional characteristics. Usually, a smaller difference indicates a higher same-cable probability of the two optical fibers.

Certainly, a plurality of types of SOP components of the optical signals may be compared to obtain a plurality of differences between amplitudes or phases of the plurality of types of SOP components of the two optical signals. Then, a same-cable probability of the two optical fibers may be calculated based on the plurality of differences. One probability value may be calculated based on one difference, and a plurality of probability values may be obtained based on the plurality of differences. Then, a manner such as a weighting operation or average value calculation is performed on the plurality of probability values, to obtain the same-cable probability between the two optical fibers.

For example, an SOP characteristic parameter of an optical signal may include three components: S1, S2, and S3. The three types of components may be separately compared between two optical signals, for example, the components S1 of the two optical signals may be compared, or the components S2 of the two optical signals may be compared, and the components S3 of the two optical signals may be compared, to obtain three differences. Three probability values are obtained based on the three differences and the foregoing probability value calculation manner. A manner such as a weighting operation or average value calculation is performed on the three probability values, to obtain the same-cable probability of the two optical fibers.

In another specific implementation, an SOP characteristic parameter of an optical signal may include an SOP frequency of the optical signal. For the SOP frequency, refer to the related description in step 701 above. A difference between SOP frequencies of two optical signals is obtained through comparison, and a same-cable probability of two optical fibers that transmit the two optical signals is calculated based on the difference. Alternatively, after the SOP frequencies of the optical signals are calculated, an SOP frequency affected by a vibration of the optical fiber is compared with a noise floor frequency, to obtain an SOP frequency change amount of the optical signal. A difference between the frequency change amounts of the two optical signals is obtained through comparison, and a same-cable probability of the two optical fibers is calculated based on the difference between the frequency change amounts.

When frequencies are obtained based on Fourier transform results of the plurality of types of SOP components, the plurality of types of SOP components may correspond to different frequency values. A plurality of frequency differences between the SOP components of the two optical signals may be calculated, and a plurality of probability values may be calculated based on the plurality of frequency differences. Then, a weighting operation, average value calculation, or the like is performed on the plurality of probability values, to obtain the same-cable probability between the two optical fibers.

In another specific implementation, an SOP characteristic parameter of an optical signal may include an SOP amplitude of the optical signal. SOP amplitudes of two optical signals may be compared, to calculate a difference between the SOP amplitudes of the two optical signals. A same-cable probability of two optical fibers is calculated based on the difference. For the SOP amplitudes, refer to the related description in step 701 above. Usually, a smaller difference between the SOP amplitudes of the two optical signals indicates a higher similarity between results of impact caused by vibrations of the optical fibers to the two optical signals, and further indicates a higher similarity between the vibrations of the two optical fibers and a higher same-cable probability of the two optical fibers. Specifically, if the SOP characteristic parameter of the optical signal includes a plurality of amplitude values, amplitude values of SOP components corresponding to the two optical signals may be compared to obtain a plurality of differences. Then, a plurality of probability values are calculated based on the plurality of differences, and a weighting operation, average value calculation, or the like is performed on the plurality of probability values, to obtain the same-cable probability of the two optical fibers.

In a possible implementation, an SOP characteristic parameter of an optical signal may include an SOP amplitude of the optical signal. Step 702 may include: calculating a difference between the SOP amplitude included in the SOP characteristic parameter of the optical signal and a noise floor part that is in the optical signal and that is not affected by a vibration of an optical fiber, to obtain an amplitude change amount of the optical signal; and then, comparing SOP amplitude change amounts of two optical signals to obtain a difference between the SOP amplitude change amounts of the two optical signals, and calculating a same-cable probability of the two optical fibers based on the difference.

Figure 12:
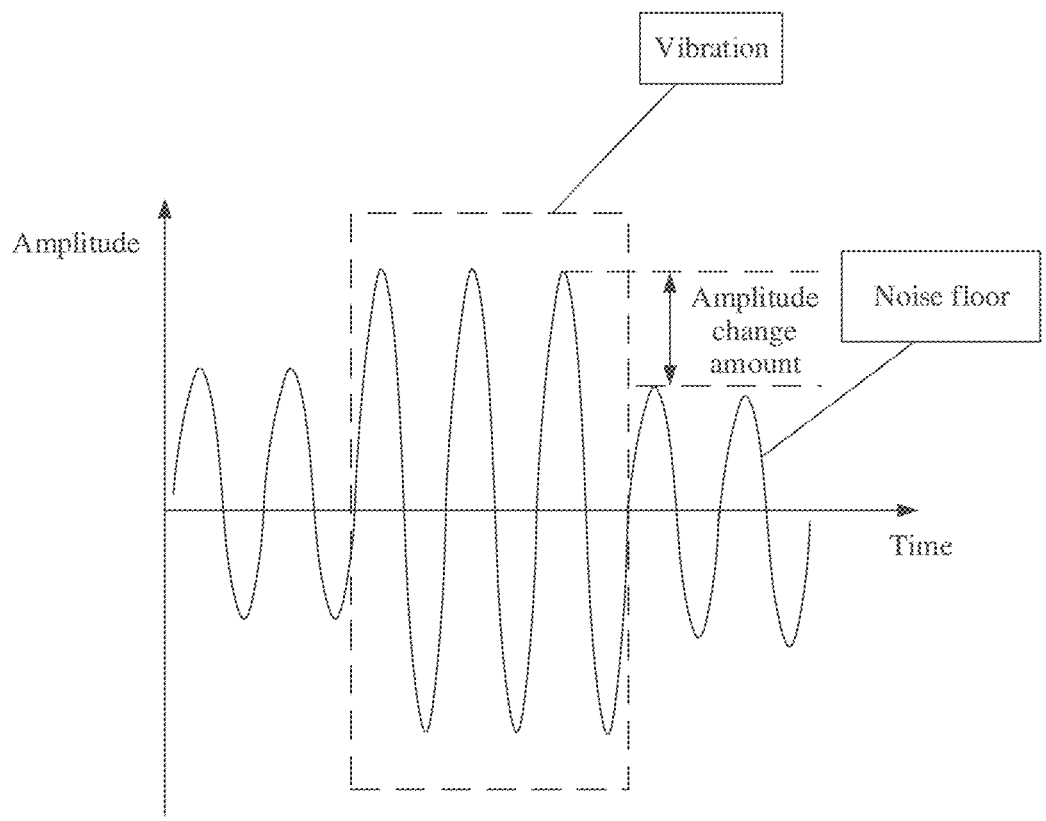
FIG. 12 is a schematic diagram of an SOP amplitude change amount according to an embodiment of this application.

For example, as shown in FIG. 12, any SOP component of the first optical signal or any SOP component of the second optical signal may include a partial component affected by a vibration and a partial noise floor component. An amplitude value of the partial component affected by the vibration in the component and an amplitude value of an optical signal part whose transmission is not affected by the vibration of the optical fiber are extracted. A difference is calculated, where the difference exists between an amplitude value of an SOP component affected by the vibration (for example, an average amplitude value of SOP components affected by the vibration or a most widely distributed amplitude value) and an amplitude value of an SOP component not affected by the vibration (for example, an average amplitude value of SOP components not affected by the vibration or a most widely distributed amplitude value), that is, an amplitude value of a noise floor. In this way, an amplitude change amount of the first SOP or the second SOP can be obtained. Then, the same-cable probability of the two optical fibers is calculated based on a difference between the amplitude change amounts of the two optical signals.

In addition, when the SOP characteristic parameter of the optical signal includes a plurality of amplitude values of SOPs, for example, includes amplitude values of the three SOP components S1, S2, and S3, three amplitude change amounts corresponding to the three SOP components S1, S2, and S3 may be calculated. Then, the plurality of amplitude change amounts corresponding to the plurality of types of SOP components of the two optical signals are compared to obtain a plurality of differences. A plurality of probability values may be calculated based on the plurality of amplitude differences, and a weighting operation, average value calculation, or the like is performed on the plurality of probability values, to obtain the same-cable probability of the two optical fibers.

Therefore, in manner 1, when vibrations occur on both optical fibers, the optical signals transmitted in the two optical fibers are also affected by the vibrations of the optical fibers and encounter changes, including changes in the SOPs of the optical signals. In this embodiment of this application, the SOP characteristic parameters of the two optical signals may be compared. Specifically, the SOP characteristic parameters of the two optical signals each include one or more of the following: any SOP component, an SOP frequency, an SOP frequency change amount, an SOP amplitude, an SOP amplitude change amount, or the like. A difference between changes caused by impact of the optical fibers to the two optical signals is determined, so as to determine the same-cable probability of the two optical fibers that transmit the optical signals. For example, when an optical fiber 1 and an optical fiber 2 are affected by vibrations, an optical signal 1 transmitted in the optical fiber 1 and an optical signal 2 transmitted in the optical fiber 2 generate similar SOP changes. The SOP changes of the optical signal 1 and the optical signal 2 may be compared to determine whether the SOP changes are the same or close. In this way, it is determined whether the vibrations experienced by the optical fiber 1 and the optical fiber 2 are the same, and a same-cable probability of the optical fiber 1 and the optical fiber 2 is calculated.

Manner 2: Based on a Phase of an Optical Signal

For a phase of an optical signal, refer to the related description in step 701 above. After phases of two optical signals are obtained, a difference between the phases of the two optical signals is calculated, and a same-cable probability of two optical fibers that transmit the two optical signals is calculated based on the difference. For a specific manner of calculating the same-cable probability based on the difference, refer to the calculation manner in manner 1 above. Details are not described herein again.

Figure 13:
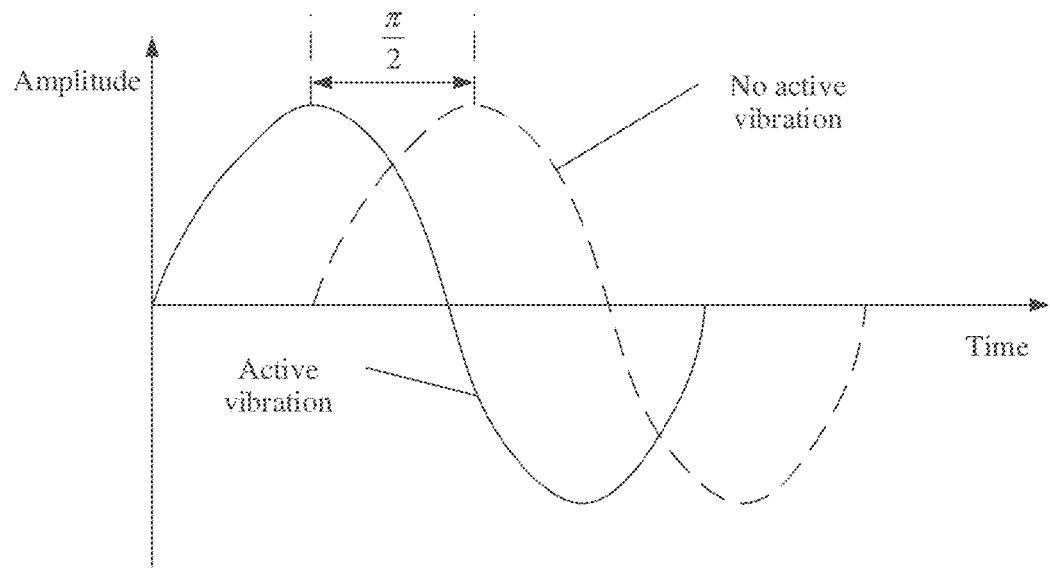
FIG. 13 is a schematic diagram of a phase change amount of an optical signal according to an embodiment of this application.

Optionally, after phases of received optical signals are detected, changes of the phases of the optical signals may be further compared to determine phase change amounts of the optical signals. The phase change amount may also be understood as an amount of a phase lead or an amount of a phase lag. For example, a phase lag is used as an example. When an optical signal is transmitted in an optical fiber, one vibration of the optical fiber may cause a phase lag to the optical signal at a moment when the optical fiber vibrates. Consequently, a phase lag occurs in a received optical signal at a moment. An amount of the phase lag of the optical signal is calculated to obtain a phase change amount of the optical signal. Then, a same-cable probability of the two optical fibers that transmit the two optical signals is calculated based on a difference between the phase change amounts of the two optical signals. For example, as shown in FIG. 13, a phase difference between an optical signal that has a phase lead and that is transmitted in an optical fiber without a vibration and an optical signal transmitted in an optical fiber with a vibration is $$\frac{\pi}{2},$$

which is a phase change amount that is of the optical signal and that is caused by the vibration of the optical fiber. Then, a same-cable probability of the two optical fibers that transmit the two optical signals is calculated based on a difference between phase change amounts of the two optical signals.

Therefore, in manner 2, a difference between phases or phase change amounts of two optical signals may be calculated, and then a same-cable probability of two optical fibers may be calculated based on the difference. In this way, a probability that an optical cable segment is shared between optical fibers can be accurately and efficiently detected.

It should be noted that, in manner 1, the various specific calculation manners in manner 1, or manner 2, a same-cable probability of two optical fibers may be separately calculated. Alternatively, after a plurality of probability values are separately calculated in different manners, a weighting operation may be performed on the plurality of probability values to obtain a final same-cable probability of two optical fibers, to improve precision of the obtained same-cable probability.

In a possible scenario, a vibration of an optical fiber may be an active vibration generated by a vibrator. A location at which the vibrator vibrates may be recorded, and then a location of an optical cable segment in which the optical fiber with the vibration is located is determined based on the location of the vibrator. For example, as shown in FIG. 4, if the vibrator vibrates at the tube well without a fiber splicing box, the optical cable segment 1 vibrates in this case. A same-cable probability calculated based on characteristic parameters that are of optical signals and that are generated due to impact of vibrations of optical fibers may be understood as a probability that the optical cable segment is shared by the two optical fibers. In addition, a probability that the same-cable segment 2 or the same-cable segment 3 is shared by two optical fibers may be further calculated in a similar manner. If same-cable probabilities of two optical fibers with respect to a plurality of optical cable segments are detected, a weighting operation may be performed on the plurality of same-cable probabilities to obtain a final same-cable probability of the two optical fibers. Alternatively, if same-cable probabilities of two optical fibers with respect to a plurality of optical cable segments are detected, a highest probability value may be used as a final same-cable probability of the two optical fibers, or the like.

Optionally, after a same-cable probability of two optical fibers is calculated, if the same-cable probability is higher than a warning threshold, same-cable risk warning information is generated, and a warning is provided based on the same-cable warning information. For example, if a same-cable probability of two optical fibers is higher than 80%, it indicates that there is a high possibility that a same-cable segment is shared between the two optical fibers. In this case, same-cable risk warning information may be generated, and the same-cable risk warning information is displayed on a display interface. In this way, a user is reminded that the probability that a same-cable segment is shared between the two optical fibers is higher than 80%, and is reminded that an optical fiber for data transmission needs to be used for timely replacement for a device that uses the two optical fibers, or is reminded that optical cable layout needs to be adjusted, or the like.

In a possible implementation, after same-cable probabilities of optical fibers in a communication network are detected, a transmission medium whose same-cable probability is higher than the warning threshold may be selected, and then a same-cable risk group may be generated based on information about the transmission medium whose same-cable probability is higher than the warning threshold. In this way, a warning may be provided for an optical fiber with a same-cable risk in the communication network in time, to perform corresponding adjustment, so that sharing a cable segment between an active path and a standby path between devices is avoided, and data transmission stability between the devices is provided.

In this implementation of this application, the vibration of the first optical fiber is generated in a first time period, the vibration of the second optical fiber is generated in a second time period, and the first time period and the second time period fall within a same time period range. For example, an optical fiber 1 may vibrate at 9 a.m., and an optical fiber 2 may also vibrate at 9 a.m. Usually, if the first time period and the second time period do not fall within a same time period range, it indicates that vibrations occur in the two optical fibers at different times. In this case, it is unnecessary to compare the characteristic parameters of the optical signals transmitted in the two optical fibers, so as to avoid meaningless calculation. For example, if an optical fiber 1 vibrates at 9:00 a.m. and an optical fiber 2 vibrates at 2:00 p.m., comparison based on the vibrations in the different time periods is not needed, so as to reduce workload of meaningless calculation. It can be understood that, in this application, a time period of a vibration of an optical fiber is used as a selection condition to perform comparison on changes that are caused to optical signals by vibrations of optical fibers in a same time period. In this way, a same-cable probability of the two optical fibers is calculated, thereby improving accuracy of a same-cable probability detection result.

Therefore, according to the same-cable probability detection method provided in this application, changes that are caused by impact of vibrations of two optical fibers to optical signals transmitted in the optical fibers are compared to calculate a same-cable probability of the two optical fibers. The same-cable probability can be accurately and efficiently calculated. This can avoid labor costs caused by manual recording and maintenance, reduce an error of manually recorded information, and detect a same-cable probability of two optical fibers in time, to avoid a same-cable risk caused by untimely manual recording.

The foregoing describes in detail the procedure of the same-cable probability detection method provided in this application. The following describes, based on the foregoing same-cable probability detection method, a network device provided in this application.

Figure 14:
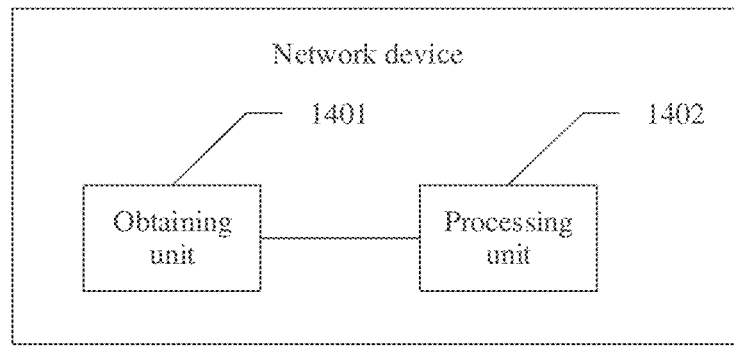
FIG. 14 is a schematic diagram of a structure of a network device according to this application.

FIG. 14 is a schematic diagram of a structure of a network device according to this application. The network device may include an obtaining unit 1401 and a processing unit 1402.

The obtaining unit 1401 is configured to obtain a first characteristic parameter of a first optical signal and a second characteristic parameter of a second optical signal, where the first optical signal is a signal transmitted in a first optical fiber, the second optical signal is a signal transmitted in a second optical fiber, the first characteristic parameter is generated after the first optical signal is affected by a vibration of the first optical fiber, and the second characteristic parameter is generated after the second optical signal is affected by a vibration of the second optical fiber. The obtaining unit 1401 is configured to perform step 701 in FIG. 7 above.

The processing unit 1402 is configured to obtain, based on the first characteristic parameter and the second characteristic parameter, a probability that at least one optical cable segment of the first optical fiber and at least one optical cable segment of the second optical fiber include a same-cable segment, where the same-cable segment is an optical cable segment shared by the first optical fiber and the second optical fiber. The processing unit 1402 is configured to perform step 702 in FIG. 7 above.

In a possible implementation, the first characteristic parameter includes a first state of polarization SOP characteristic parameter of the first optical signal, and the second characteristic parameter includes a second SOP characteristic parameter of the second optical signal.

In a possible implementation, the first SOP characteristic parameter includes a plurality of first SOP components, and the second SOP characteristic parameter includes a plurality of second SOP components; and the processing unit 1402 is specifically configured to: compare any first SOP component in the first SOP characteristic parameter with any second SOP component in the second SOP characteristic parameter, to obtain the probability that the at least one optical cable segment of the first optical fiber and the at least one optical cable segment of the second optical fiber include a same-cable segment.

In a possible implementation, the first SOP characteristic parameter includes a first SOP frequency, and the second SOP characteristic parameter includes a second SOP frequency; and the processing unit 1402 is specifically configured to: compare the first SOP frequency with the second SOP frequency, to obtain the probability that the at least one optical cable segment of the first optical fiber and the at least one optical cable segment of the second optical fiber include a same-cable segment.

In a possible implementation, the first SOP characteristic parameter includes a first SOP amplitude, and the second SOP characteristic parameter includes a second SOP amplitude; and the processing unit 1402 is specifically configured to: compare the first SOP amplitude with the second SOP amplitude, to obtain the probability that the at least one optical cable segment of the first optical fiber and the at least one optical cable segment of the second optical fiber include a same-cable segment.

In a possible implementation, the first characteristic parameter includes a phase of the first optical signal, and the second characteristic parameter includes a phase of the second optical signal.

In a possible implementation, the first characteristic parameter is generated after the first optical signal is affected by a vibration of the first optical fiber in a first time period, the second characteristic parameter is generated after the second optical signal is affected by a vibration of the second optical fiber in a second time period, and the first time period and the second time period fall within a same time period range.

In a possible implementation, the vibration of the first optical fiber and the vibration of the second optical fiber are vibrations with a preset characteristic, the first characteristic parameter is a characteristic parameter matching the preset characteristic, and the second characteristic parameter is a characteristic parameter matching the preset characteristic.

Figure 15:
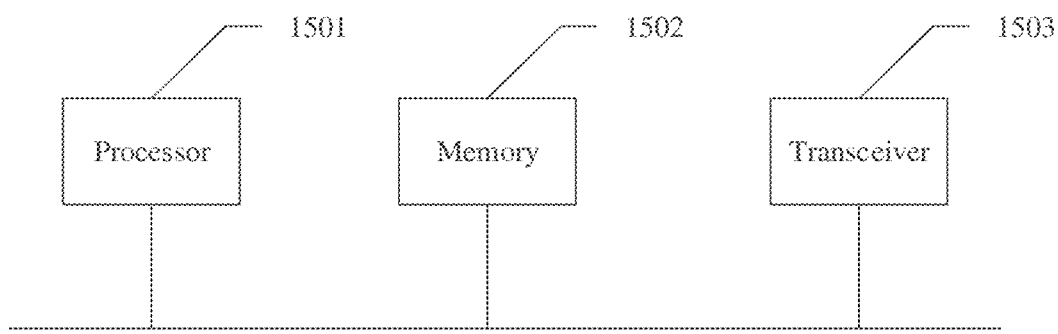
FIG. 15 is a schematic diagram of a structure of another network device according to this application.

FIG. 15 is a schematic diagram of a structure of a network device according to this application. The network device may include a processor 1501, a memory 1502, and a transceiver 1503. The processor 1501, the memory 1502, and the transceiver 1503 are interconnected by using a line. The memory 1502 stores program instructions and data.

The memory 1502 stores program instructions and data that correspond to the steps performed by the network device in the implementations corresponding to FIG. 7 to FIG. 13.

The processor 1501 is configured to perform the steps performed by the network device in any embodiment in FIG. 7 to FIG. 13. Specifically, the processor 1501 is configured to perform step 702 in FIG. 7.

The transceiver 1503 may be configured to receive and send data, and is specifically configured to perform step 701 in FIG. 7.

Optionally, the transceiver 1503 may include an SOP detector, which is configured to detect an SOP of an optical signal to obtain an SOP characteristic parameter of the optical signal.

An embodiment of this application further provides a digital processing chip. The digital processing chip integrates a circuit and one or more interfaces that are configured to implement the function of the processor 1501. When a memory is integrated into the digital processing chip, the digital processing chip can complete the method steps in any one or more of the foregoing embodiments. When no memory is integrated into the digital processing chip, the digital processing chip may be connected to an external memory over an interface. Based on program code stored in the external memory, the digital processing chip implements the actions performed by the sending device or the receiving device in the foregoing embodiment.

A person of ordinary skill in the art may understand that all or some of the steps of the method embodiments may be implemented by a program instructing related hardware. The program may be stored in a computer-readable storage medium. The storage medium mentioned above may be a read-only memory, a random access memory, or the like. Specifically, for example, the foregoing processor may be a central processing unit, a general-purpose processor, a digital signal processor (DSP), an application-specific integrated circuit (ASIC), a field programmable gate array (FPGA), another programmable logic device, a transistor logic device, a hardware component, or any combination thereof. Whether the functions are performed by hardware or software depends on particular applications and design constraints of the technical solutions. A person skilled in the art may use different methods to implement the described functions for each particular application, but it should not be considered that the implementation goes beyond the scope of this application.

When software is used for implementation, all or some of the method steps described in the foregoing embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    obtaining a first characteristic parameter of a first optical signal and a second characteristic parameter of a second optical signal, wherein the first optical signal is a signal transmitted in a first optical fiber, the second optical signal is a signal transmitted in a second optical fiber, the first characteristic parameter is a parameter of the first optical signal with the first optical signal being affected by a vibration of the first optical fiber, and the second characteristic parameter is a parameter of the second optical signal with the second optical signal being affected by a vibration of the second optical fiber;
    obtaining, based on the first characteristic parameter and the second characteristic parameter, a probability that at least one optical cable segment of the first optical fiber and at least one optical cable segment of the second optical fiber comprise a same-cable segment, the same-cable segment being an optical cable segment shared by the first optical fiber and the second optical fiber; and determining, based on the probability, whether the first optical fiber and the second optical fiber share a cable segment.

2. The method according to claim 1, wherein the first characteristic parameter comprises a first state of polarization (SOP) characteristic parameter of the first optical signal, and the second characteristic parameter comprises a second SOP characteristic parameter of the second optical signal.

3. The method according to claim 2, wherein the first SOP characteristic parameter comprises a plurality of first SOP components, and the second SOP characteristic parameter comprises a plurality of second SOP components; and obtaining, based on the first characteristic parameter and the second characteristic parameter, the probability that at least one optical cable segment of the first optical fiber and the at least one optical cable segment of the second optical fiber comprise the same-cable segment comprises:

comparing a first SOP component in the first SOP characteristic parameter with a second SOP component in the second SOP characteristic parameter, to obtain the probability that the at least one optical cable segment of the first optical fiber and the at least one optical cable segment of the second optical fiber comprise the same-cable segment, wherein the first SOP component and the second SOP component are components in a same dimension.

4. The method according to claim 2, wherein the first SOP characteristic parameter comprises a first SOP frequency, and the second SOP characteristic parameter comprises a second SOP frequency; and obtaining, based on the first characteristic parameter and the second characteristic parameter, the probability that the at least one optical cable segment of the first optical fiber and the at least one optical cable segment of the second optical fiber comprise the same-cable segment comprises:

comparing the first SOP frequency with the second SOP frequency, to obtain the probability that the at least one optical cable segment of the first optical fiber and the at least one optical cable segment of the second optical fiber comprise the same-cable segment.

5. The method according to claim 2, wherein the first SOP characteristic parameter comprises a first SOP amplitude, and the second SOP characteristic parameter comprises a second SOP amplitude; and obtaining, based on the first characteristic parameter and the second characteristic parameter, the probability that the at least one optical cable segment of the first optical fiber and the at least one optical cable segment of the second optical fiber comprise the same-cable segment comprises:

comparing the first SOP amplitude with the second SOP amplitude, to obtain the probability that the at least one optical cable segment of the first optical fiber and the at least one optical cable segment of the second optical fiber comprise the same-cable segment.

6. The method according to claim 1, wherein the first characteristic parameter comprises a phase of the first optical signal, and the second characteristic parameter comprises a phase of the second optical signal.

7. The method according to claim 1, wherein the first characteristic parameter is generated after the first optical signal is affected by a vibration of the first optical fiber in a first time period, the second characteristic parameter is generated after the second optical signal is affected by a vibration of the second optical fiber in a second time period, and the first time period and the second time period are within a same time period range.

8. The method according to claim 1, wherein the vibration of the first optical fiber and the vibration of the second optical fiber are vibrations with a preset characteristic, the first characteristic parameter matches the preset characteristic, and the second characteristic parameter matches the preset characteristic.

9. A network device, comprising:

a processor; and a non-transitory computer readable storage medium having a plurality of computer executable instructions that, when executed by the processor, cause the processor to perform operations comprising:

obtaining a first characteristic parameter of a first optical signal and a second characteristic parameter of a second optical signal, wherein the first optical signal is a signal transmitted in a first optical fiber, the second optical signal is a signal transmitted in a second optical fiber, the first characteristic parameter is a parameter of the first optical signal with the first optical signal being affected by a vibration of the first optical fiber, and the second characteristic parameter is a parameter of the second optical signal with the second optical signal being affected by a vibration of the second optical fiber;

obtaining, based on the first characteristic parameter and the second characteristic parameter, a probability that at least one optical cable segment of the first optical fiber and at least one optical cable segment of the second optical fiber comprise a same-cable segment, the same-cable segment being an optical cable segment shared by the first optical fiber and the second optical fiber; and determining, based on the probability, whether the first optical fiber and the second optical fiber share a cable segment.

10. The network device according to claim 9, wherein the first characteristic parameter comprises a first state of polarization (SOP) characteristic parameter of the first optical signal, and the second characteristic parameter comprises a second SOP characteristic parameter of the second optical signal.

11. The network device according to claim 10, wherein the first SOP characteristic parameter comprises a plurality of first SOP components, and the second SOP characteristic parameter comprises a plurality of second SOP components; and obtaining, based on the first characteristic parameter and the second characteristic parameter, the probability that the at least one optical cable segment of the first optical fiber and the at least one optical cable segment of the second optical fiber comprise the same-cable segment comprises: comparing a first SOP component in the first SOP characteristic parameter with a second SOP component in the second SOP characteristic parameter, to obtain the probability that the at least one optical cable segment of the first optical fiber and the at least one optical cable segment of the second optical fiber comprise the same-cable segment, wherein the first SOP component and the second SOP component are components in a same dimension.

12. The network device according to claim 10, wherein the first SOP characteristic parameter comprises a first SOP frequency, and the second SOP characteristic parameter comprises a second SOP frequency; and obtaining, based on the first characteristic parameter and the second characteristic parameter, the probability that the at least one optical cable segment of the first optical fiber and the at least one optical cable segment of the second optical fiber comprise the same-cable segment comprises: comparing the first SOP frequency with the second SOP frequency, to obtain the probability that the at least one optical cable segment of the first optical fiber and the at least one optical cable segment of the second optical fiber comprise the same-cable segment.

13. The network device according to claim 10, wherein the first SOP characteristic parameter comprises a first SOP amplitude, and the second SOP characteristic parameter comprises a second SOP amplitude; and obtaining, based on the first characteristic parameter and the second characteristic parameter, the probability that the at least one optical cable segment of the first optical fiber and the at least one optical cable segment of the second optical fiber comprise the same-cable segment comprises: comparing the first SOP amplitude with the second SOP amplitude, to obtain the probability that the at least one optical cable segment of the first optical fiber and the at least one optical cable segment of the second optical fiber comprise the same-cable segment.

14. The network device according to claim 9, wherein the first characteristic parameter comprises a phase of the first optical signal, and the second characteristic parameter comprises a phase of the second optical signal.

15. The network device according to claim 9, wherein the first characteristic parameter is generated after the first optical signal is affected by a vibration of the first optical fiber in a first time period, the second characteristic parameter is generated after the second optical signal is affected by a vibration of the second optical fiber in a second time period, and the first time period and the second time period are within a same time period range.

16. The network device according to claim 9, wherein the vibration of the first optical fiber and the vibration of the second optical fiber are vibrations with a preset characteristic, the first characteristic parameter matches the preset characteristic, and the second characteristic parameter matches the preset characteristic.

17. A communication system, comprising at least two network devices, wherein one of the at least two network devices is configured to perform:

obtaining a first characteristic parameter of a first optical signal and a second characteristic parameter of a second optical signal, wherein the first optical signal is a signal transmitted in a first optical fiber, the second optical signal is a signal transmitted in a second optical fiber, the first characteristic parameter is a parameter of the first optical signal with the first optical signal being affected by a vibration of the first optical fiber, and the second characteristic parameter is a parameter of the second optical signal with the second optical signal being affected by a vibration of the second optical fiber; and obtaining, based on the first characteristic parameter and the second characteristic parameter, a probability that at least one optical cable segment of the first optical fiber and at least one optical cable segment of the second optical fiber comprise a same-cable segment, wherein the same-cable segment is an optical cable segment shared by the first optical fiber and the second optical fiber; and determining, based on the probability, whether the first optical fiber and the second optical fiber share a cable segment.

18. The communication system according to claim 17, wherein the first characteristic parameter comprises a first state of polarization (SOP) characteristic parameter of the first optical signal, and the second characteristic parameter comprises a second SOP characteristic parameter of the second optical signal.

19. The communication system according to claim 18, wherein the first SOP characteristic parameter comprises a plurality of first SOP components, and the second SOP characteristic parameter comprises a plurality of second SOP components; and obtaining, based on the first characteristic parameter and the second characteristic parameter, the probability that the at least one optical cable segment of the first optical fiber and the at least one optical cable segment of the second optical fiber comprise the same-cable segment comprises:

comparing any first SOP component in the first SOP characteristic parameter with any second SOP component in the second SOP characteristic parameter, to obtain the probability that the at least one optical cable segment of the first optical fiber and the at least one optical cable segment of the second optical fiber comprise the same-cable segment, wherein the first SOP component and the second SOP component are components in a same dimension.

20. The communication system according to claim 18, wherein the first SOP characteristic parameter comprises a first SOP frequency, and the second SOP characteristic parameter comprises a second SOP frequency; and obtaining, based on the first characteristic parameter and the second characteristic parameter, the probability that the at least one optical cable segment of the first optical fiber and the at least one optical cable segment of the second optical fiber comprise the same-cable segment comprises:

comparing the first SOP frequency with the second SOP frequency, to obtain the probability that the at least one optical cable segment of the first optical fiber and the at least one optical cable segment of the second optical fiber comprise the same-cable segment.

* * * * *